(12) United States Patent
Shah

(10) Patent No.: US 8,615,528 B2
(45) Date of Patent: Dec. 24, 2013

(54) CLOUD DATABASE SHARING

(75) Inventor: Ankur B. Shah, Surat (IN)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 13/192,529

(22) Filed: Jul. 28, 2011

(65) Prior Publication Data

US 2013/0031136 A1    Jan. 31, 2013

(51) Int. Cl.
*G06F 7/00* (2006.01)

(52) U.S. Cl.
USPC ............ 707/783; 707/792; 707/805; 709/226

(58) Field of Classification Search
None
See application file for complete search history.

(56) References Cited

U.S. PATENT DOCUMENTS

| | | | |
|---|---|---|---|
| 7,213,231 B1 | 5/2007 | Bandhole et al. | |
| 7,802,248 B2 | 9/2010 | Broquere et al. | |
| 2006/0259957 A1* | 11/2006 | Tam et al. | 726/3 |
| 2007/0250833 A1 | 10/2007 | Araujo, Jr. et al. | |
| 2009/0216859 A1* | 8/2009 | Dolling | 709/218 |
| 2010/0131949 A1* | 5/2010 | Ferris | 718/1 |
| 2011/0055399 A1* | 3/2011 | Tung et al. | 709/226 |
| 2011/0093596 A1 | 4/2011 | Zimmet et al. | |
| 2011/0106789 A1 | 5/2011 | Gao et al. | |
| 2011/0153824 A1* | 6/2011 | Chikando et al. | 709/226 |
| 2012/0022910 A1* | 1/2012 | Chi et al. | 705/7.22 |
| 2012/0054251 A1* | 3/2012 | Matsubara et al. | 707/809 |
| 2012/0110005 A1* | 5/2012 | Kuo et al. | 707/769 |
| 2012/0144407 A1* | 6/2012 | Hacigumus et al. | 719/328 |

OTHER PUBLICATIONS

Author: Microsoft; Title: "Microsoft System Center Virtual Machine Manager 2012—System Center Virtual Machine Manager 2012 Beta Reviewer's Guide"; Date: May 2011; Pertinent pp. 1-45 (whole attached pdf file).*
IBM, "Share Cloud Compute Resources Based on Friend Status/Requests in Social Communities", IP.com No. IPCOM000191430D, Jan. 4, 2010, http://www.ip.com/pubview/IPCOM000191430D.
BM, "Federated repositories", Web documentation for WebSphere Application Server V6.1, I, 2005, http://publib.boulder.ibm.com/infocenter/wasinfo/v6r1/index.jsp?topic=/com.ibm.websphere.base.doc/info/aes/ae/cwim_fedrepos.html, primary article and related links. This web site was still active on Jul. 27, 2011.
IBM, "Federated repositories", Web documentation for WebSphere Application Server V6.1, I, 2005, http://publib.boulder.ibm.com/infocenter/wasinfo/v6r1/index.jsp?topic=/com.ibm.websphere.base.doc/info/aes/ae/cwim_fedrepos.html, primary article and related links. This web site was still active on Jul. 27, 2011.

* cited by examiner

*Primary Examiner* — Fred Ehichioya
*Assistant Examiner* — Anh Tai Tran
(74) *Attorney, Agent, or Firm* — Anthony V S England; Joseph C. Polimeni

(57) ABSTRACT

A method, system and computer program product is provided achieving database sharing by providing an interface to contribute a database and a set of resources to a resource pool in a first cloud environment. The interface further allowing a user to input parameters identifying a database, a set of resources, a set of authorization credentials, and a sharing policy. The interface further comprising responsive to the user using the interface and providing the interface parameters which identify the database, the set of resources, the set of authorization credentials, and the sharing policy, adding the database, the set of resources, the set of authorization credentials, and the sharing policy to the database resource pool in the cloud environment, sharing the database, the set of resources, according to the sharing policy, and utilizing the set of authorization credentials.

14 Claims, 6 Drawing Sheets

CLOUD DATABASE SHARING

BACKGROUND

1. Field

The invention relates to a computing environment. More particularly to a computer program, method, and system for sharing cloud database resources.

2. General Background

Cloud computing provides a means to use computing resources that are remote from a client machine being directly accessed by a user. There are various applications and services available as cloud applications. Many businesses already use cloud computing and cloud databases. These businesses are developing and providing end user applications. As individuals purchase their 'Virtual PCs' with virtual desktops, customized applications, etc., they will be utilizing virtual or cloud databases.

WebSphere® Application Server provides support for Federated repositories. (WebSphere is a registered trademark of International Business Machines Corporation.) These repositories can be file-based repositories utilizing a Lightweight Directory Access Protocol (LDAP) for reading and editing directories over an internet Protocol (IP) network. A directory in this sense is an organized set of records: for example, a telephone directory is an alphabetical list of persons and organizations with an address and phone number in each "record," LDAP repositories, or a sub-tree of an LDAP repository, are defined and theoretically combined under a single realm. In addition, the federated repositories functionality in WebSphere Application Server supports the logical joining of entries across multiple user repositories when the Application Server searches and retrieves entries from the repositories. For example, when an application calls for a sorted list of people whose age is greater than twenty, WebSphere Application searches all of the repositories in the federated repositories configuration. The results are combined and sorted before the Application Server returns the results to the application.

Additional details of the Federated repository support is further described on: publib.boulder.ibm.com/infocenter/wasinfo/y6r1/index.jsp?topic=/com.ibm.websph ere.base-.doc/info/aes/ae/cwim_fedrepos.html Currently, controlling cloud database allocation is the role of the database administrator which is present in the cloud. The end-user has no control. An administrator may have a policy of reallocating cloud database resources to other cloud database users until they are needed. Also, there is no support for contributing a database resource by an end user to a cloud environment.

While this is adequate for businesses, consumers who subscribe or purchase a virtual PC want to feel like they 'own' what they purchased, even if it is a virtual purchase. Using current business allocation methods completely limits the social norm of 'sharing" personally owned items, specifically allowing an owned cloud database to be shared with an associates or relatives.

The cloud environment has the potential to provide many advantages to a server or specific web site support. The cloud environment typically has security, load balancing, and other desirable features where computing resources may be adjusted to meet changing needs.

SUMMARY

According to one embodiment of the invention, there is provided a computer program product with a computer readable storage medium having computer readable program code embodied therewith supporting contributing a sharing of database resources to a cloud. The computer readable program code is configured to provide an interface allowing a user to contribute a database and a set of resources to a resource pool in a cloud environment. The interface allows a user to input parameters identifying a database, a set of resources, a set of authorization credentials, and a sharing policy. Responsive to the user using the interface and providing the interface parameters which identify the database, the set of resources, the set of authorization credentials, and the sharing policy, adding the database, the set of resources, the set of authorization credentials, and the sharing policy to the database resource pool in the first cloud environment, allowing the first cloud environment to share the database, the set of resources, according to the sharing policy, and to utilize the set of authorization credentials.

According to another embodiment of the invention, there is provided a method for achieving database sharing providing an interface to contribute a database and a set of resources to a resource pool in a cloud environment. The interface further allowing a user to input parameters identifying a database, a set of resources, a set of authorization credentials, and a sharing policy. The interface further comprising responsive to the user using the interface and providing the interface parameters which identify the database, the set of resources, the set of authorization credentials, and the sharing policy, adding the database, the set of resources, the set of authorization credentials, and the sharing policy to the database resource pool in the cloud environment, sharing the database, the set of resources, according to the sharing policy, and utilizing the set of authorization credentials.

According to another embodiment of the invention, there is provided a system for achieving database sharing comprising a processor, computer readable program code configured to provide an interface allowing a user to contribute a database and a set of resources to a resource pool in a cloud environment. The interface allows the user to input a set of parameters, identifying a database, a set of resources, a set of authorization credentials, and a sharing policy. Responsive to the user using the interface and providing the interface parameters which identify the database, the set of resources, the set of authorization credentials, and the sharing policy, adding the first database, the set of resources, the set of authorization credentials, and the sharing policy to the database resource pool in the cloud environment, and utilizing and sharing the database, the set of resources, according to the sharing policy, and utilizing the set of authorization credentials.

DRAWINGS

The above-mentioned features of the present invention may be better understood, and its numerous objects, features, and advantages made apparent to those skilled in the art by taken in conjunction with the accompanying drawings wherein like reference numerals denote like elements and in which:

FIG. 1 depicts a cloud computing node according to an embodiment of the present invention and is a block diagram example of a data processing system in which the methods described herein can be implemented.

FIG. 2 provides an extension example of the information handling system environment shown in FIG. 1 and a networking cloud environment to illustrate that the methods, systems, and program products described herein can be performed on a wide variety of information handling systems which operate in a networked environment.

DETAILED DESCRIPTION

Figure 1:
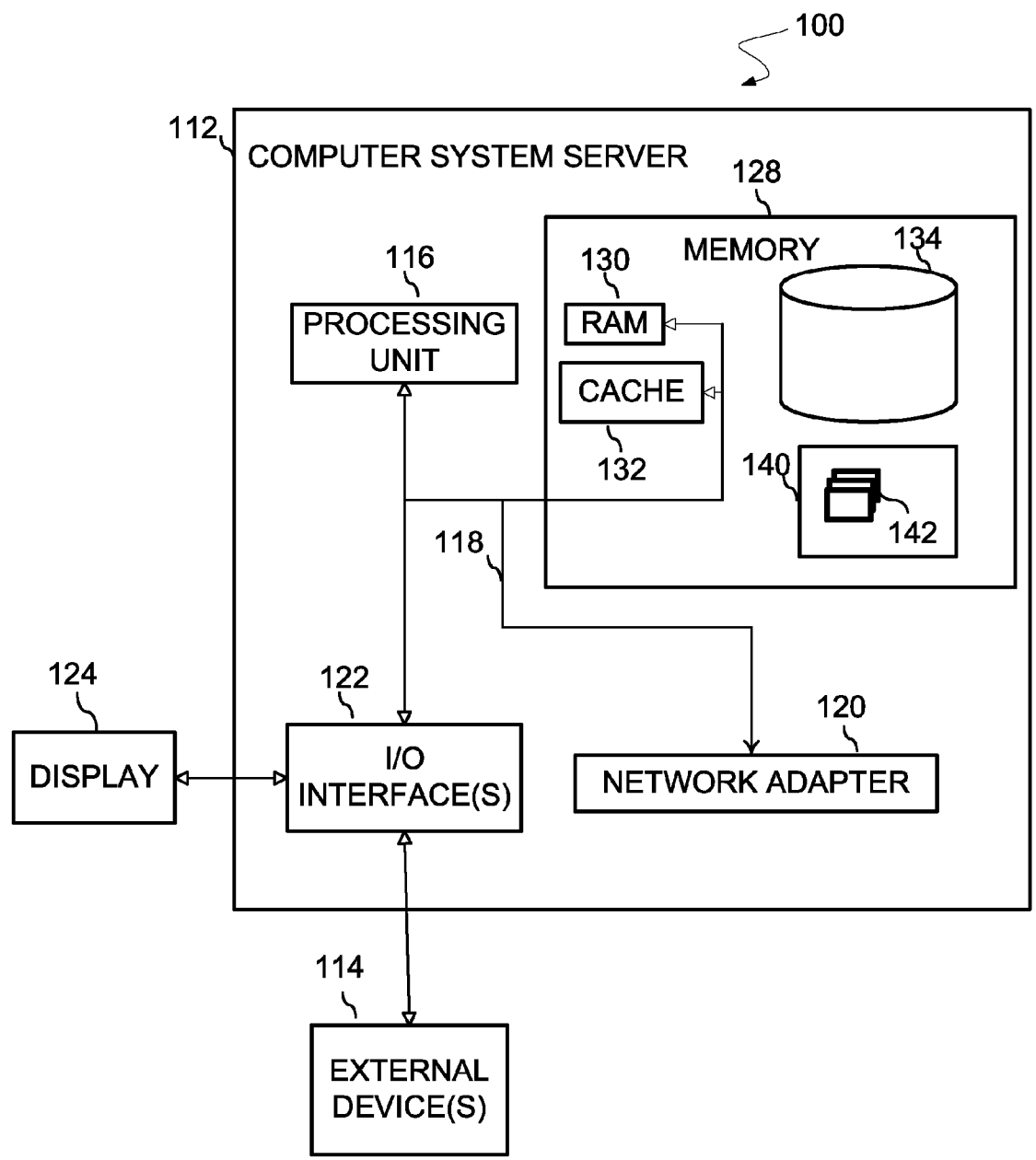

Embodiments of the invention are described below with reference to drawings in detail.

In view of the deficiencies in prior art, various method, system, and computer program product embodiments of the invention are provided herein. The main idea of the invention is to provide support allowing an end user to control a set of cloud data bases and support providing a consistent view of the data in the set of cloud data bases for one or more applications. It is understood in advance that although the invention described herein includes a detailed description on cloud computing, implementation of the teachings recited are not limited to the existing cloud computing environment. Rather, embodiments of the present invention are capable of being implemented in conjunction with any other cloud computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including networks, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth herein. In cloud computing node 100 there is a computer system/server 112, which is operational with numerous other general purpose or special purpose computing system environments or configurations. Examples of well-known computing systems, environments, and/or configurations that may be suitable for use with computer system/server 112 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 112 in cloud computing node 100 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of computer system readable media. Such media may be any available media that is accessible by computer system/server 112, and it includes both volatile and non-volatile media, removable and non-removable media.

System memory 128 can include computer system readable media in the form of volatile memory, such as random access memory (RAM) 130 and/or cache memory 132. Computer system/server 112 may further include other removable/non-removable, volatile/non-volatile computer system storage media. By way of example only, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces. As will be further depicted and described below, system memory 128 may include at least one program product having a set (e.g., at least one) of program modules that are configured to carry out the functions of embodiments of the invention.

Program/utility 140, having a set (at least one) of program modules 142, may be stored in system memory 128 by way of example, and not limitation, as well as an operating system, one or more application programs, other program modules, and program data. Each of the operating systems may have one or more application programs, other program modules, and program data or some combination thereof, and may include an implementation of a networking environment. Program modules 142 generally carry out the functions and/or methodologies of embodiments of the invention as described herein.

Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via Input/Output (I/O) interfaces 122. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server. Examples, include, but are not limited to: microcode, device drivers, redundant processing units, external disk drive arrays, RAID systems, tape drives, and data archival storage systems, etc.

Figure 2:
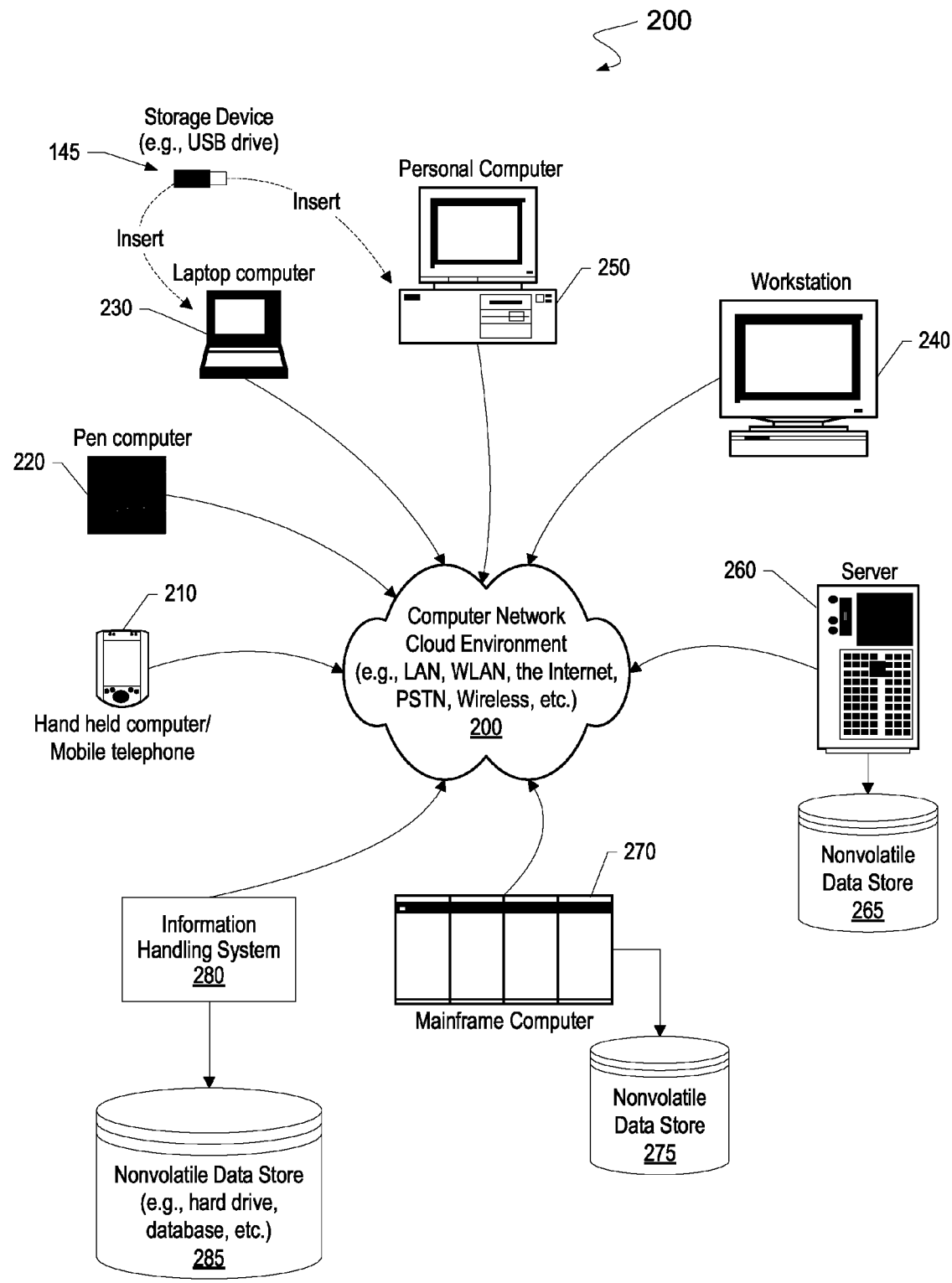

Referring now to FIG. 2, illustrative cloud computing environment 200 is depicted. FIG. 2 provides an extension example of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As shown, cloud computing environment 200 comprises one or more cloud computing nodes with which local computing devices used by cloud consumers, such as, for example, personal digital assistant (PDA) 210 or cellular telephone 210, desktop computer 250, laptop computer 230, and/or other mobile device such as an automobile computer system may communicate. Nodes in the computer network 205 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices shown in FIG. 2 are intended to be illustrative only and that computing nodes in cloud computing environment 200 can communicate with any type of computerized device over any type of network and/or network addressable connection (e.g., using a web browser). Types of computer network that can be used to interconnect the various information handling systems include Local Area Networks (LANs), Wireless Local Area Networks (WLANs), the Internet, the Public Switched telephone Network (PSTN), and others. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260 archival storage systems 265, etc. Other types of information handling systems that are not individually shown in FIG. 2 are represented by information handling system 280. As shown, the various information handling systems can be networked together using computer network 205.

Figure 3:
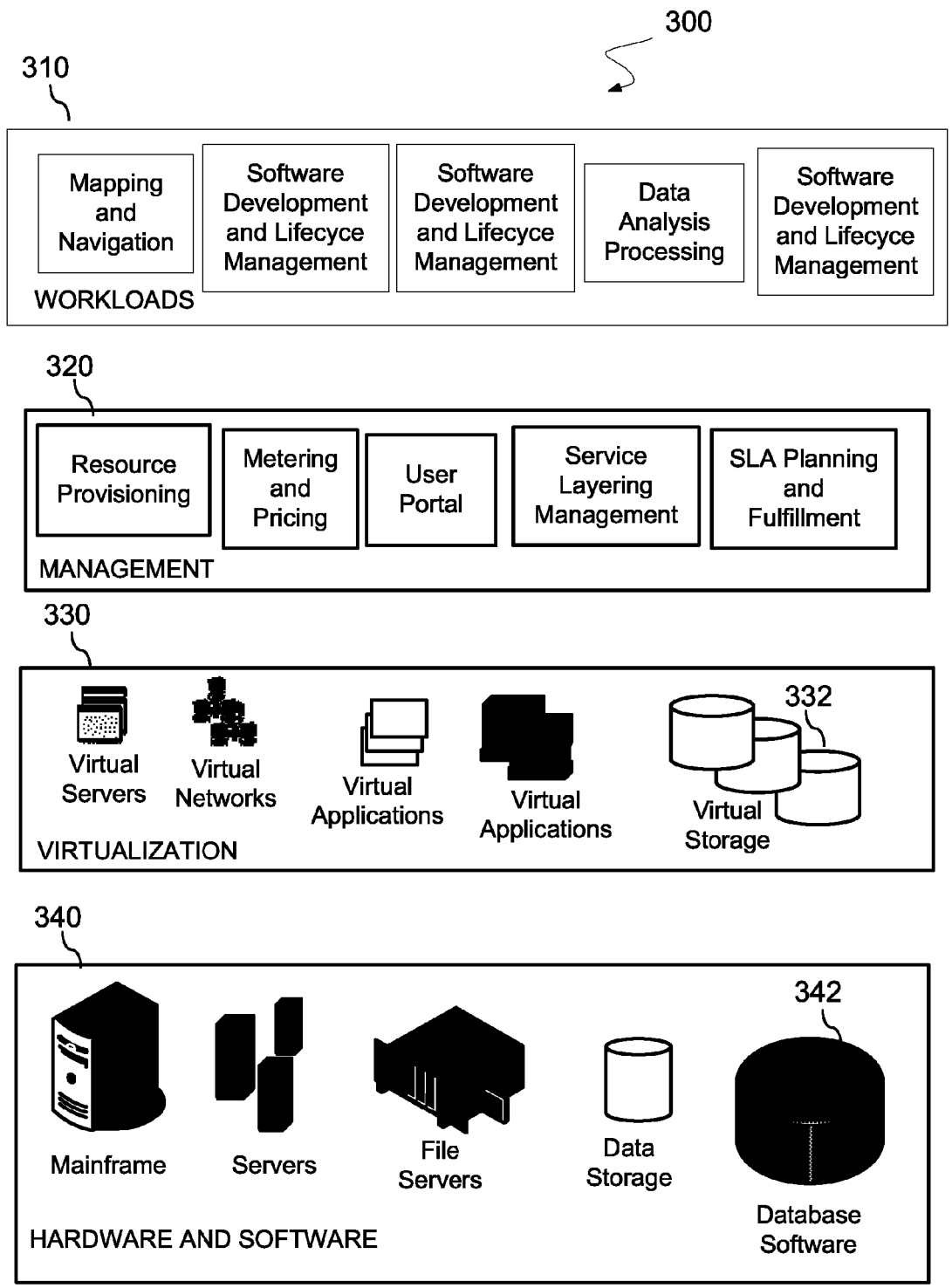
FIG. 3 depicts a cloud computing environment with abstraction model layers according to an embodiment of the present invention.

Referring now to FIG. 3, a set of functional abstraction layers 300 provided by cloud computing environment 200 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 340 includes hardware and software components. Examples of hardware components include mainframes, examples include IBM® zSeries® systems; RISC (Reduced Instruction Set Computer) architecture based servers, IBM pSeries® systems; IBM xSeries® systems; IBM BladeCenter® systems; storage devices; networks and networking components. Examples of software components include network application server software, in one example IBM WebSphere application server software; and database software, in one example IBM DB2® database software. (IBM, zSeries, pSeries, xSeries, BladeCenter, and DB2 are trademarks of International Business Machines Corporation registered in many jurisdictions worldwide).

Virtualization layer 330 provides an abstraction layer from which the following examples of virtual entities may be provided: virtual servers; virtual storage 332; virtual networks, including virtual private networks; virtual applications and operating systems; and virtual clients.

In one example, management layer 320 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management layer 320 provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 310 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

Figure 4:
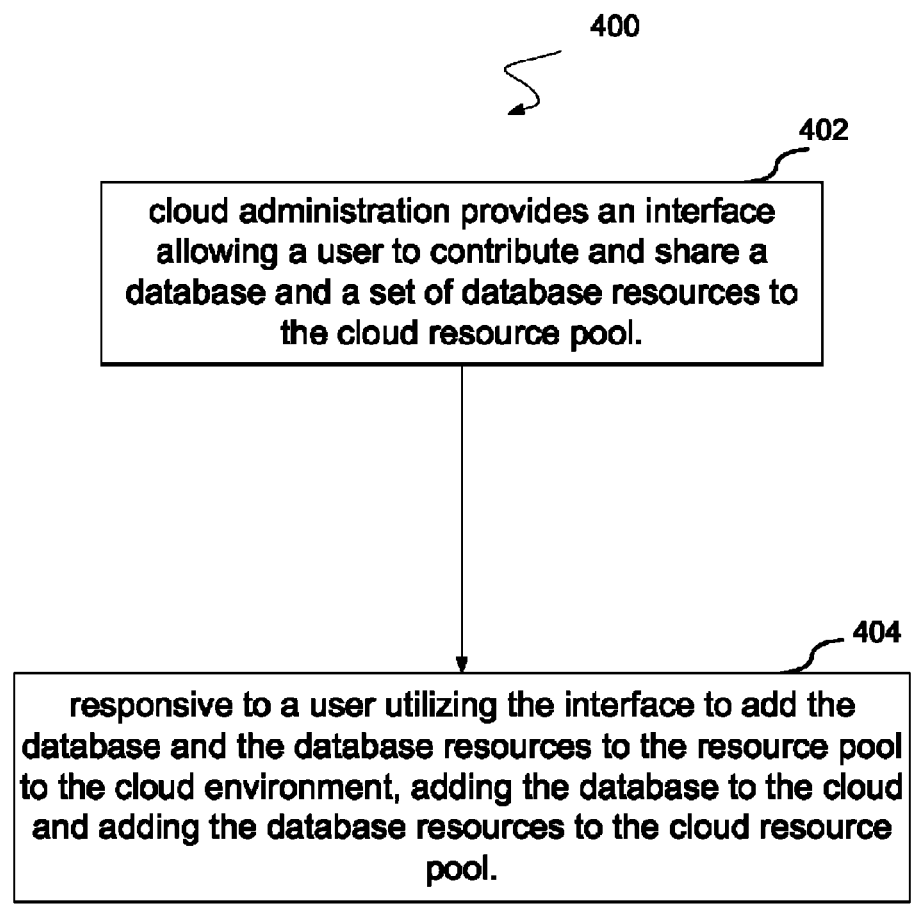
FIG. 4 depicts a flow for contributing a database and its resources to a cloud and adding the database to the cloud resource pool.

Referring now to FIG. 4, the steps for allowing a user to contribute a database and its resources to the resource pool in a cloud environment is shown. Cloud infrastructure 200 supports in a step 402 an interface in the cloud administration for a user to supply a database and its resources to the resource pool in a cloud environment. The interface supports input parameters identifying a database, a workspace environment, a set of authorization credentials, and a sharing policy. The interface may have default values for these parameters in which case the values for these parameters may not actually be entered by an end user or commands calling the interface. The user or application calling the interface must be authenticated by the cloud administration support. This usually involves the user supplying a user identification and password. The administration support may utilize any of the various encryption schemes to provide appropriate security. In a step 404, the interface in the step 402 adds the user supplied database and its associated environment into the resource pool in the cloud infrastructure. The interface may allow the user to supply a set of authorization credentials and a sharing policy. However, there may be default values that are used and they may not actually need to be supplied when the interface is called. The user may identify many different database resources to add to the shared pool. Examples of database resources that may be added but not limited to the shared pool include database files, schema, table spaces, workspaces, table spaces, roles, back up and recovery privileges, database engine resources including the areas for SQL processing, Parallel Query Option (PQO), indexes, shared pools, disk I/O, multi-threaded Servers (MTS), alerting profiles, and memory blocks including buffers, fragments, segments, and extents. The interface accepts user input in step 402. The user interface may provide a GUI where the user inputs parameters as entries menu entries, command line entries, scripts entries, configuration files, .xml files, or any other means of providing the required information.

Support for allowing a user to contribute a database and its resources to a cloud environment must be added to the cloud infrastructure. This addition to the cloud environment is added by methods specific to the cloud environment for which the database is being contributed. In an exemplary embodiment, a storage system is utilized that unifies the key storage functions for both assignment and protection of data. The infrastructure supports the virtualization of the storage system allowing data mobility within a shared resource pool.

In a typical embodiment, additional configuration parameters may be added to configuration files. These configuration parameters would include the name of the resources to share and the authority required to access those resources. The cloud infrastructure must also allow the resources to be shared.

In a first example in an embodiment, a Financial database is provided by a user where a set of configuration information supplied for the database support is added to the cloud environment. The information includes a characterization of the database or a database name, groups were the database is hosted, a network name, an application for load balancing, a connection profile. This can be achieved with very limited knowledge of the details for creation of a cloud. A private cloud is a cloud that is provisioned and managed on-premise by an organization. The private cloud is deployed using an organization's own hardware to leverage the advantages of the private cloud model. An organization manages the private cloud definition, accesses to the private cloud, and the underlying physical resources.

A private cloud provides the following benefits:

Self service. Administrators can delegate management and usage of the private cloud while retaining the opaque usage model. Self-service users do not need to ask the private cloud provider for administrative changes beyond increasing capacity and quotas as their needs change.

Resource pooling. Through the private cloud, administrators can collect and present an aggregate set of resources, such as storage and networking resources. Resource usage is limited by the capacity of the private cloud and by user role quotas.

Opacity. Self-service users have no knowledge of the underlying physical resources.

Elasticity. Administrators can add resources to a private cloud to increase the capacity.

Optimization. Usage of the underlying resources is continually optimized without affecting the overall private cloud user experience.

A user can create a private cloud from various sources:

Host groups that contain resources from various hosts.

A resource pool for a virtual machine

During private cloud creation, the user selects the underlying fabric resources that will be available in the private cloud, configures library paths for private cloud users, and sets the capacity for the private cloud. Before the user creates a private cloud, the user should configure the fabric resources, such as storage, networking, library servers and shares, host groups, and hosts.

Example Scenario Overview

In the following examples, a private cloud named Finance is created from resources in configured host groups. A private cloud named Marketing is created from a virtual machine resource pool. The configuration information may be entered as entries in a GUI.

The following information is provided:
Finance (private cloud created from host groups)
Host groups: Seattle\Tier0_SEA, Seattle\Tier1_SEA, New York\Tier0_NY, New York\Tier1_NY
Logical network: BACKEND
Load balancer: LoadBalancer01.contoso.com
VIP profile: Web tier (HTTPS traffic)
Storage classification: GOLD and SILVER
Read-only library shares: SEALibrary and NYLibrary
Stored virtual machine path: VMMServer01\SEALibrary\Finance Cloud Stored VMs
Capability profile: HyperV
DB Location: x:/Db2/DB
Resource: Workspace In a second example, in an embodiment, the following is provided:
Marketing (private cloud created from a VMware resource pool)
Virtual Machine resource pool: Resource pool 1
Logical network: BACKEND
Load balancer: LoadBalancer01.contoso.com
VIP profile: Web tier (HTTPS traffic)
Read-only library shares: SEALibrary and NYLibrary
Stored virtual machine path: VMMServer01\SEALibrary\Marketing Cloud Stored VMs
Capability profile: ESX
DB Base: x:/Db2/DB
Resource: Schema Once the database and its resources are added to the cloud infrastructure, they may be shared with other users.

There are many examples where in there is a requirement to share a database across the country. Support can be provided by sending a web service request and receiving responses for any support already built into the database services. Consider that US Government has to provide Right to information (RTI) to its citizens. An individual should be able to access the requested information from a database providing this information. This should be available as needed by providing the request in a specific format and with some authentication and it should be provided securely.

Another example for providing database support in a cloud environment is where each bank needs to monitor for fraudulent activities. Having one database for each bank and then replicating the information or having one central database and then having all banks access that database would have performance problems during heavy activity. Instead a bank contributes its shared workbench to the cloud and all accesses to the information are via the cloud infrastructure. The bank sends a web request in an xml web request standard format and the cloud database responds in the configured format. Since security is very important for banking, each request has its credentials validated. The advantages include: 1) Saving space as opposed to having multiple databases at multiple bank locations 2) Improved information transfer rates 3) Accurate synchronization of information by taking advantage of the cloud infrastructure.

Support for access to information from a user's social networking account, a user's bank account as well from the user's social security information, could be provided by the user by adding the local views to the resource pool to become shared resources in the cloud.

Providing user resources to a cloud resource pool allows for shared access to the desired information quickly and securely. This approach allows the cloud environment to be used for security, and for scalability with changing workloads.

Cloud database sharing is based upon the Virtual Member Manager (VMM) database share concepts. The end user sees the consolidated views even if those applications and data bases are hosted by different virtual machines and all the data can be seen under the same application even if those data are coming from any federated repositories. These can be also extended up to social community relationships, ranking, and setting up a priority on associates and friendship agreements as well as it could be done automatically and manually depending upon the status of the buddies.

Support for the shared views of resources could be provided by a user interface similar to those already supported by virtual member manager allowing control over other resources. The enhancement adds control over the databases by utilizing underlying application programming interfaces that can include various means such as configuration files, parameters passed to subroutines, environment variables, or any other way of passing data to a function, subroutine, or method within an application. The interface allows a primary user or administrator with ownership level to control the usage of the cloud database resource. In one embodiment the user interface provides a menu identifying the associate/user requesting a type of access (READ or READ and WRITE) to a database already known to virtual member manager, allowing acceptance or denial. As an example, a primary user, John, has purchased a virtual PC, complete with virtual desktop and computing cloud database resource. File systems, applications, and databases are available on that virtual PC or some more databases on some different virtual machines. While in active use, all cloud database resources allocated to the primary user's virtual PC are in use by that primary user. By adding the resources of the database to the resource pool, the database and its resources become virtual cloud resources. The resources may include, but are not limited to CPU, memory, applications, files, entire virtual PCs, and other database resources. When an associate requests a cloud database or any other database, John can choose to share the database resource or decline the request. If John is not on-line, his social community profile can be customized to automatically accept or reject certain associate cloud database usage requests. In another example, where an associate, Jane, is approved for read and update access for a specific set of days and times, and the date time criteria is met, that acceptance is translated into a set of commands that reallocates the cloud database for the specified period of time then governs the use of the shared database so that its use complies with the acceptance criteria.

Figure 5:
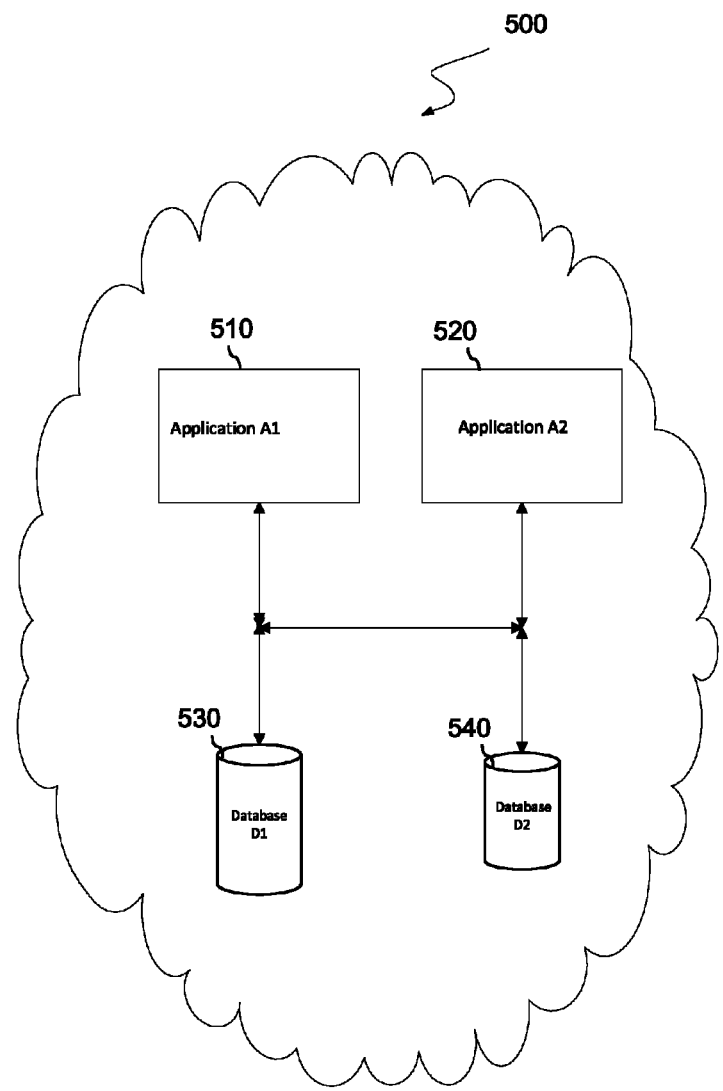
FIG. 5 depicts an example of multiple databases shared across multiple applications at the same time where all cloud applications can access the data from the cloud environment using their credentials.

FIG. 5 shows a cloud environment 500, corresponding to cloud environment 200, where an application A1 510 and an application A2 520 both have shared access to databases D1 530 and database D2 540. Both databases D1 530 and databases D2 540 were added to the resource pool in cloud environment 500 utilizing the steps in flow 400. The cloud infrastructure allows for multiple databases to be shared across the multiple applications at the same time and all application can access the data from cloud environment using their credentials.

In another embodiment the set of supported repositories have a common schema and utilize an RDF/OWL format. In this example, the virtual member manager understands the schema which is published through the RDF OWL format and it gives a federated view across the repository. In another embodiment, only SQL interfaces are utilized to access the databases and the format of the schema is described utilizing a common .xml format.

Figure 6:
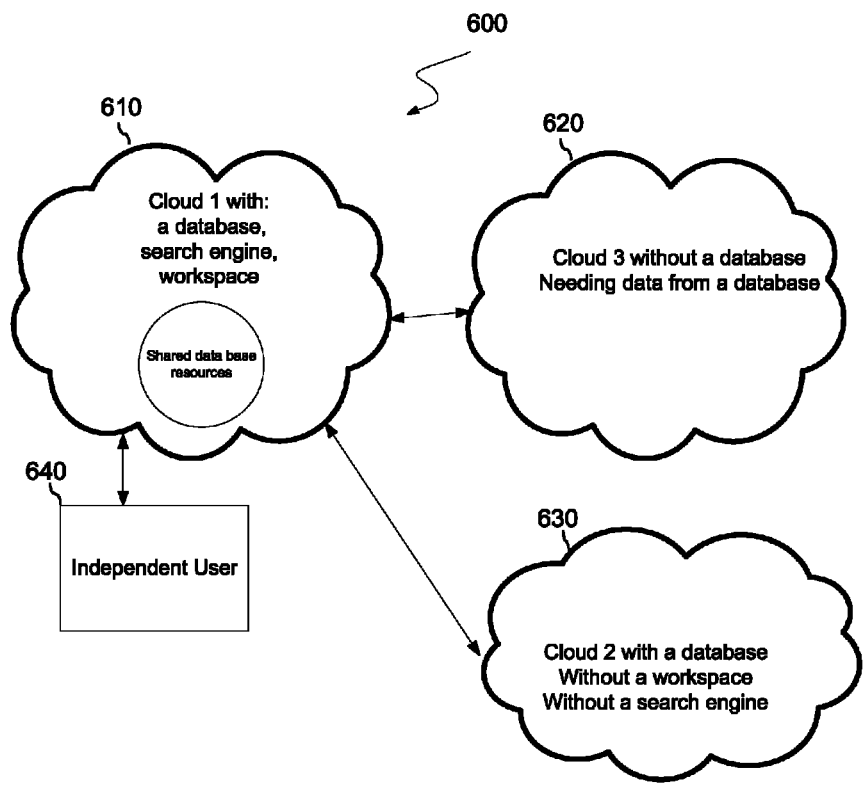
FIG. 6 depicts multiple databases shared across multiple cloud environments at the same time where all cloud applications can access the data from the cloud environment using their credentials.

FIG. 6 shows multiple cloud environments 600, where cloud environment 610 has a database with a search engine and a workspace. The database in the cloud environment 610 has been contributed by a user utilizing the steps in flow 400 allowing the sharing of the database resources including its workspace, to cloud environment 630, which has a different database, but no workspace and no search engine. In addition, cloud environment 620 has no database, but can retrieve and access the database in cloud environment 610. Independent users can also access the database and resources contributed to cloud environment 610.

Different cloud databases may have different information. A first social network database may contain personal photos and pictures regarding a first trip to Hawaii. A second social network database may contain family photos and pictures related to a family union. Both these databases may be viewed as if they were a single database utilizing the virtual member manager capability on a virtual pc. When a family member asks to borrow the virtual pc with the shared access, the access may be automatically granted as per the allowed criteria. Similarly the profile may deny access to specific users or any users not specifically authorized.

The policy may adjust with usage and social relationships and also change depending on a prioritized list of usage. For example, certain 'close' friends can automatically access content that casual friends could not, and strangers would not even know the virtual PC exists. This enables a user to request "Sally, can I get the reunion photos for our club newsletter?" If actively in use, Sally can grant access to a specific folder. If not actively in use, Sally's profile can analyze the request criteria and share predefined folders. Share any search results based on friends request keywords.

The policy may share until returned or for a period of time. There are a variety of different ways database resources can be shared. In one policy the database resources may be shared until returned: Open ended sharing where database access can be shared until they are returned. There would always be an override where the owner can force-return the resource. In the case of write access, this may be a roll back of all changes or a commit of all changes.

The policy may share the database for update access for a time period, then when the work is done, the changes are committed and the write access is revoked. In another example, the database update access is allowed only while certain projects or function is being worked on. As an example, a user may want to share database write access only related to records for a yearbook video which the yearbook is being processed, but as soon as the yearbook is completed, the database transaction is committed and the access revoked. Similarly, the act of granting write access to the database can time out. If database records meeting a specific criteria are not read to prevent others from updating those records, assuming repeatable read, and an indication is not returned with a specified time, the agreement can become stale and may be pulled back. This could require the actual updates be made within a specified period of time. This may be useful for times when read access is also allowed by separate users/friends also accessing the databases. The goal is to make the resource available to as many friends as possible and this helps keep it from being locked to a single friend when not in use.

The policy may support broadcast requests, where at any time, a friend can post a common request: "Alumni, I'm editing the yearbook video, can I have write access to your yearbook related data? If the records are actively in use, Sally can choose to contribute a portion of her resource "Share 10% of my yearbook records" or "Share up to 90% of my yearbook records" In this example, If not active, Sally's profile can specify the amount of resource to share. The broadcast requests can gather committed resources until the proper amount is received, then the timing will start. For example, if I need to get video processing done but it requires certain amount or types of resources, the workload can wait to run until all 100% of the resources are committed. This may be supported by having a total count of yearbook related records or total size of the records.

Friend sharing-levels and friendship ranking examples include various conditions such as: Let all friends share my full database capabilities. Let these friends share my databases in read only mode, but not update access. Let these friends share my database information based on my application groupings. A numerical ranking of individual friends or groups of friends may be provided. If three requests come in, accept the request from the highest ranking friend. If a resource was accepted for Friend 1, but a request comes in later from a higher ranking friend, the resource could automatically be given a timer to stop sharing with Friend 1 so that Friend 2 can have it.

Database charity requests may be supported where at any time a friend may post a charity resource request where a large amount of database access resource is needed for a worthy cause. In this case, the friend-of-friends network may be used if the cause is worthy and the friend is trusted. If active, Sally could receive the request and choose to forward it onto all her friends. If not active, Sally's profile could specify which friends are most trusted and automatically commit certain percentage of compute database resources and then forward the recommendation onto all her friends.

This may be done when the database or virtual machine provides interfaces allowing specification of these resources.

Commenting on Shared Workloads: A friend could be running a database workload that takes a lot of CPU. Maybe they're editing a video. Maybe they are recording a song. When a friend shares this activity, it can become a public workload in the cloud. If friends want to contribute resources so that workload is done faster, or is more responsive for the friend, Sally can comment on that now public workload. "I like what you're doing. Here is 30% of my database access resource to help you get it done faster". This can only be supported if the database or virtual machine provides interfaces supporting this specification. In other examples, the usage may be a binary share or no sharing allowed. Accurate support may require operating system resource monitoring and allocation support or hardware performance counters.

Additional external criteria can be used when sharing database resources. For example, a user may set up a profile preference allowing only a certain number of requests database access requests per day . . . or once she shares only allowing 40% of the database records meeting a specified criteria. The profile automatically ignores/reject requests until the shared resources return to the specified usage criteria. The preferences can be tailored for specific users or for particular purposes, such as, what database resources can be used for. If a friend requests a database resource for a charity specified workload. The user is expected to not also utilize the database resource for creating personal content. The database may provide interfaces for this support by keeping track of the total amount of records and/or total space taken by the records, the total records accessed by a transaction and/or the space taken by the transaction, and comparing these numbers to apply a policy.

Providing the support for allowing a user to add and share databases on a cloud provides a significant improvement to the cloud environment. In addition, the described support includes sharing a user's workspace, clusters, schema, heterogeneous environment, all supported prerequisites, Jar files, etc. The support may be tailored so that the user may avoid sharing a database in their environment or it may be tailored to share a database and its data. This sharing may be provided utilizing the highly secure security provided by the cloud secured network As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), \an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

While the apparatus and method have been described in terms of what are presently considered to be the most practical and preferred embodiments, it is to be understood that the invention need not be limited to the disclosed embodiments. The invention is intended to cover various modifications and similar arrangements included within the spirit and scope of the claims, the scope of which should be accorded the broadest interpretation so as to encompass all such modifications and similar structures. The present invention includes any and all embodiments of the following claims.

I claim:

1. A computer program product for achieving database sharing in a cloud, the computer program product comprising:

computer readable storage memory having computer readable program code embodied therewith, the computer readable program code comprising:

computer readable program code configured to provide an interface to contribute a database and a set of resources to a resource pool in cloud environment responsive to receiving input from a first user including parameters identifying the database, the set of resources, a set of authorization credentials and a sharing policy, wherein in the cloud environment a virtual machine of a first user in a first cloud provides access for the first user to a database and resources of the first user and a virtual machine of a second user in a second cloud provides an application for the second user, wherein authorization credentials include a relationship credential defining a predetermined relationship of a requester to the first user in a social network of the first user, wherein the sharing policy includes a policy of allowing use of the database and set of resources based on the relationship credential and wherein the computer readable program code is also configured for automatically allowing use of the database and set of resources by the second user responsive to the second user requesting access to the database and set of resources and the second user satisfying the relationship credential; and computer readable program code configured to provide access for the second user to the first user's database and set of resources when the database and set of resources are contributed to the resource pool by the first user, wherein the access for the second user includes access via a view by the second user's virtual machine in the second cloud corresponding to a view of the first user's database by the first user's virtual machine in the first cloud.

2. The computer program product of claim 1, wherein the computer readable program code is configured such that authentication and access to the database is controlled by cloud authentication.

3. The computer program product of claim 1, wherein the computer readable program code is configured such that, responsive to a request for access to the database by the second user, applying the sharing policy, and responsive to the sharing policy allowing a change for the second user, updating the access permissions to the database for the second user.

4. The computer program product of claim 3, wherein the computer readable program code is also configured for predetermined action based on a timeframe.

5. The computer program product of claim 4, wherein the computer readable program code is also configured to allow usage to the database based on a current usage of the database.

6. The computer program product according to claim 3, wherein the computer readable program code is also configured for predetermined action based on information in another database.

7. A method for achieving database sharing of an application in a cloud comprising:

providing an interface to contribute a database and a set of resources to a resource pool in a cloud environment responsive to receiving input from a first user including parameters identifying the database, the set of resources, a set of authorization credentials, and a sharing policy, wherein in the cloud environment a virtual machine of a first user in a first cloud provides access for the first user to a database and resources of the first user and a virtual machine of a second user in a second cloud provides an application for the second user, wherein receiving parameters identifying a set of authorization credentials includes receiving a relationship credential defining a predetermined relationship of a requester to the first user in a social network of the first user, wherein receiving parameters identifying a sharing policy includes receiving a sharing policy for allowing use of the database and set of resources based on the relationship credential and wherein the method further comprises: automatically allowing use of the database and set of resources by the second user responsive to the second user requesting access to the database and set of resources and the second user satisfying the relationship credential; and providing access for the second user to the first user's database and set of resources when the database and set of resources are contributed to the resource pool by the first user, wherein the access for the second user includes access via a view by the second user's virtual machine in the second cloud corresponding to a view of the first user's database by the first user's virtual machine in the first cloud.

8. The method of claim 7 further comprising:
performing predetermined action based on a timeframe.

9. The method of claim 7, further comprising:
responsive to a request for access to the database by the second user, applying the sharing policy, and responsive to the sharing policy allowing a change for the second user, updating the access permissions to the database for the second user.

10. The method of claim 9 further comprising:
performing predetermined action based on information in another database.

11. A system for achieving database sharing of an application comprising:

a processor; and computer readable program code, wherein when the computer readable program code is executed by the processor the system performs database sharing of an application, the computer readable program code comprising:

computer readable program code configured to provide an interface to contribute a database and set of resources to a resource pool in a cloud environment responsive to receiving input from a first user, including parameters, identifying the database, the set of resources, a set of authorization credentials, and a sharing policy, wherein in the cloud environment a virtual machine of a first user in a first cloud provides access for the first user to a database and resources of the first user and a virtual machine of a second user in a second cloud provides an application for the second user, wherein the authorization credentials include a relationship credential defining a predetermined relationship of a requester to the first user in a social network of the first user, wherein the sharing policy includes a policy of allowing use of the database and set of resources based on the relationship credential and wherein the computer readable program code is also configured for automatically allowing use of the database and set of resources by the second user responsive to the second user requesting access to the database and set of resources and the second user satisfying the relationship credential; and computer readable program code configured to provide access for the second user to the first user's database and set of resources when the database and set of resources are contributed to the resource pool by the first user, wherein the access for the second user includes access via a view by the second user's virtual machine in the second cloud corresponding to a view of the first user's database by the first user's virtual machine in the first cloud.

12. The system of claim 11, further comprising:
the system is configured such that authentication and access to the first database is controlled by cloud authentication.

13. The system of claim 11, further comprising:
the system is configured such that responsive to a request for access to the database by the second user, applying the sharing policy, and responsive to the sharing policy allowing a change for the second user, updating the access permissions to the database for the second user.

14. The system of claim 13 further comprising:
the system configured to perform predetermined action based on a timeframe.

* * * * *